(No Model.)

C. A. HOLLAND.
ANIMAL TRAP.

No. 351,510. Patented Oct. 26, 1886.

Witnesses.
O. J. Hayes
B. F. McLean

Inventor.
Charles A. Holland

UNITED STATES PATENT OFFICE.

CHARLES A. HOLLAND, OF SHOE HEEL, NORTH CAROLINA.

ANIMAL-TRAP.

SPECIFICATION forming part of Letters Patent No. 351,510, dated October 26, 1886.

Application filed June 2, 1886. Serial No. 203,963. (No model.)

*To all whom it may concern:*

Be it known that I, CHARLES A. HOLLAND, a citizen of the United States, and a resident of Shoe Heel, in the county of Robeson and State of North Carolina, have invented a new and useful Improvement in Rat-Traps; and I do hereby declare the following to be a full, clear, and exact description of the same, reference being had to the accompanying drawings, making a part of this specification, in which—

Figure 1:
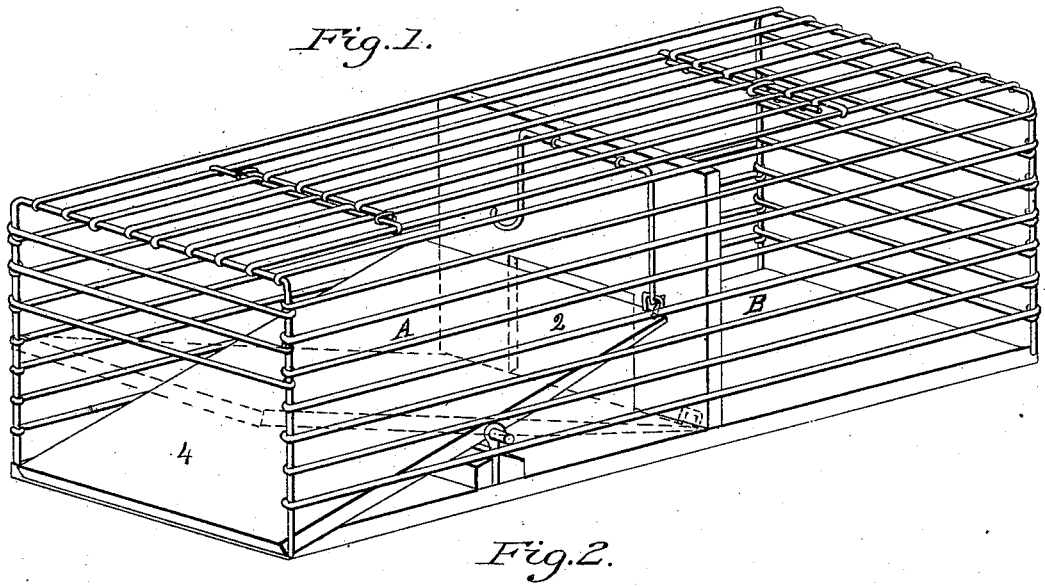
Figure 2:
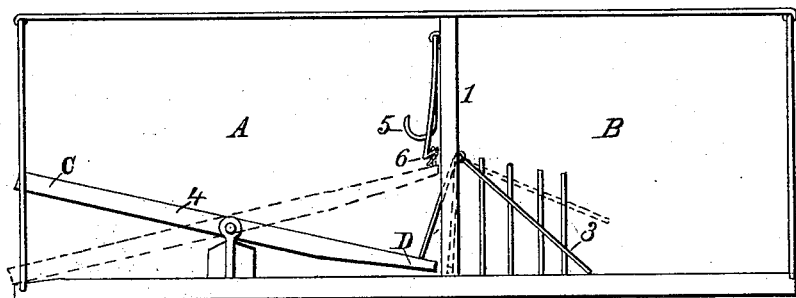
Figure 3:
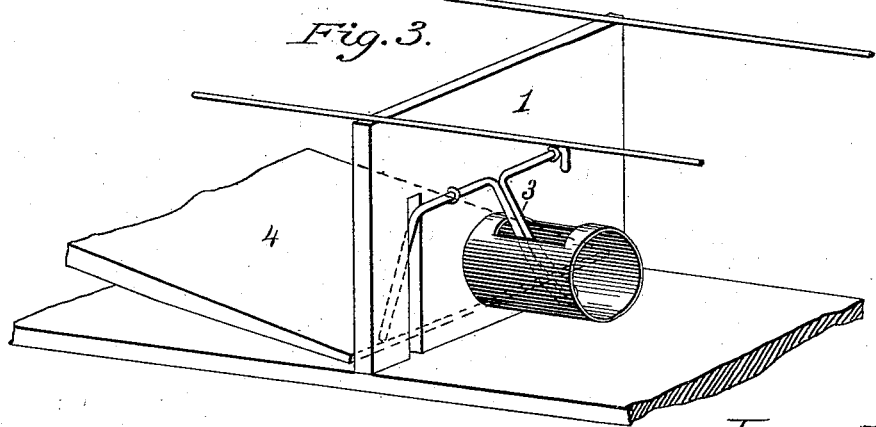

Figure 1 is a perspective view of my improved trap. Fig. 2 is a longitudinal section of the same, and Fig. 3 is a detail view thereof.

The object of this invention is to catch rats and other small animals automatically in an expeditious manner, the trap resetting itself after being "sprung."

To this end the invention consists in the novel construction and arrangement of devices, as will be hereinafter more particularly described, and specifically pointed out in the claim.

A and B represent two compartments of a rectangular wire cage or trap, which are divided from each other by means of a central or nearly central partition, said partition having cut therein at its lower side or bottom a square opening, 2.

C represents a tilting platform, which is pivotally secured to two short pins or uprights, having eyes in their upper ends, through which pivots secured in the edges of the tilting platform upon each side pass, thus pivotally securing the platform within the compartment A. This platform C has secured to one corner thereof a catch or loop, within which engages one end of an angularly-bent rod, which passes through eyes secured near the top of the division-partition, the other end of the rod, which depends parallel with the former, constituting the hook upon which the bait is placed.

In the compartment B, on both sides of the opening 2 and of the gate 3, are a series of upright rods, which serve as guards to the said gate, and thereby prevent the return of the animal to the compartment A through the said opening 2.

In Fig. 3 is shown a modification of the gate, in which a section of a hollow tube is used in lieu of the square opening 2 with its wire guard, the said tube being slotted on its upper side for the passage or to admit the free movement of the end of the gate 3 therein.

The operation is as follows: The trap being baited and set, the animal passes upon the platform and approaches the bait, upon the seizing of which the hook 6, which supports the platform, is withdrawn from the eyebolt, and the inner end of the platform descends, thereby closing the entrance to compartment A. Finding his retreat cut off, the animal passes therein under the gate 3 into the compartment B, and in passing therein the act of raising the gate releases the shorter arm of the bent lever, of which the gate forms the longer arm, thereby releasing the platform, which resumes its normal position, and is thus set for another animal.

I claim—

In an animal-trap having two connected compartments, a pivoted gravity-platform mounted in the outer compartment and swinging down by the opening in the partition-wall, a stop on the bait-holder, which normally engages and holds the platform in its upper or set position, and a gate pivoted above the opening between the two sections of the trap, and having a projecting arm, which swings through such opening and engages the gravity-platform, retaining it in its lower position until released by the opening of the gate, all combined as set forth.

CHARLES A. HOLLAND.

Witnesses:
B. F. McLEAN,
O. S. HAYES.